US008725408B2

(12) United States Patent
Hochkirchen et al.

(10) Patent No.: US 8,725,408 B2
(45) Date of Patent: May 13, 2014

(54) DRIVING ROUTE SITUATION PREDICTION FOR VEHICLE PERFORMANCE OPTIMIZATION

(75) Inventors: Thomas Hochkirchen, Vaals (NL); Mark Eifert, Munich (DE); Maurice Rienks, Weert (NL); Christian Ress, Aachen (DE); Aria Etemad, Aachen (DE); Marcus Boerger, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 1171 days.

(21) Appl. No.: 11/427,594

(22) Filed: Jun. 29, 2006

(65) Prior Publication Data

US 2007/0010933 A1  Jan. 11, 2007

(30) Foreign Application Priority Data

Jul. 6, 2005 (EP) .................................... 05106151

(51) Int. Cl.
*G01C 21/00* (2006.01)
*G01C 21/34* (2006.01)

(52) U.S. Cl.
USPC ........... 701/410; 701/400; 701/411; 701/414; 340/995.13; 340/995.19; 340/995.2; 340/995.21; 340/995.22

(58) Field of Classification Search
USPC ............. 701/1, 117–119, 200–202, 209–210, 701/400, 410–411, 414; 340/995.13, 340/995.19–995.27
See application file for complete search history.

(56) References Cited

U.S. PATENT DOCUMENTS

| | | | |
|---|---|---|---|
| 4,930,084 A * | 5/1990 | Hosaka et al. ................... 701/98 |
| 5,521,823 A | 5/1996 | Akita et al. |
| 5,612,881 A * | 3/1997 | Moroto et al. ................. 701/209 |
| 5,892,346 A * | 4/1999 | Moroto et al. ................. 318/587 |
| 5,913,917 A * | 6/1999 | Murphy ........................ 701/123 |
| 6,088,636 A * | 7/2000 | Chigumira et al. ............. 701/26 |
| 6,249,723 B1 | 6/2001 | Lutz |
| 6,381,522 B1 | 4/2002 | Watanabe et al. |
| 6,487,477 B1 | 11/2002 | Woestman et al. |
| 6,591,188 B1 * | 7/2003 | Ohler ............................ 701/209 |
| 6,629,034 B1 * | 9/2003 | Kozak et al. ................... 701/200 |
| 6,740,002 B1 | 5/2004 | Stridsberg |
| 7,176,813 B2 * | 2/2007 | Kawamata et al. ...... 340/995.13 |
| 2003/0050742 A1 * | 3/2003 | Sakamoto et al. ................ 701/1 |
| 2004/0030471 A1 | 2/2004 | Faye |
| 2004/0068359 A1 * | 4/2004 | Neiss et al. ..................... 701/96 |

(Continued)

FOREIGN PATENT DOCUMENTS

| | | | |
|---|---|---|---|
| DE | 10035027 A1 | 1/2002 | |
| JP | 5155276 | * 6/1993 | ............ B60W 10/00 |

*Primary Examiner* — Jack W Keith
*Assistant Examiner* — Chuong P Nguyen
(74) *Attorney, Agent, or Firm* — Tung & Associates; Raymond L. Coppiellie

(57) ABSTRACT

The invention relates to a method for prediction and identification of journey situations. A method for prediction of journey situations has the following steps: defining a plurality of standard journey situations, with each standard journey situation being characterized by a group of driving state parameters; defining a plurality of route state parameters in order to describe the state of a journey route; determining an association rule which associates in each case one group of values of the route state parameters with a standard journey situation; recording of an intended journey route; determining values of the route state parameters for the intended journey route; and associating the intended journey route with one of the standard journey situations on the basis of the association rule.

7 Claims, 3 Drawing Sheets

(56) References Cited

U.S. PATENT DOCUMENTS

2005/0093720 A1* 5/2005 Yamane et al. .......... 340/995.13
2005/0131634 A1* 6/2005 Ignatin .......................... 701/202
2006/0259233 A1* 11/2006 Chien et al. ................... 701/200

* cited by examiner

DRIVING ROUTE SITUATION PREDICTION FOR VEHICLE PERFORMANCE OPTIMIZATION

FIELD OF INVENTION

The present invention relates to a method for identification and prediction of journey situations. In particular, the invention relates to a method by means of which it is possible to identify and to predict journey situations in defined categories, so that the information obtained can be used for different applications, for example for controlling a battery charger cycle, or a particle filter regeneration cycle.

BACKGROUND OF THE INVENTION

Various methods are known in the prior art for controlling the operating mode in particular of hybrid vehicles as a function, inter alia, of route-specific parameters.

By way of example, EP 1 256 476 A2 discloses an energy management system for an electric or hybrid vehicle, in which application-specific information of a navigation system is checked both with respect to the current vehicle position and with respect to the further journey conditions in a defined manner, and different control strategies (for example with regard to operation of the battery) are carried out as a function of this. The deliberate application-specific checking of the route information has the disadvantage, however, that this information cannot be used for other systems, or can be used by them only with additional complexity.

U.S. Pat. No. 6,249,723 B1 discloses a method for operation of a hybrid vehicle in which the extent of the respective use of the internal combustion engine and/or electric motor is determined, on a navigation-supported basis, as a function of an overall journey duration which is predetermined by the driver, and in the case of which, furthermore, battery charging cycles are selected taking into account the respective climbing and descending route sections to be expected. A method and a device for driving a hybrid vehicle are known from DE 101 28 758 A1, in which the proportion of the electric-motor drive is controlled taking account not only of the battery state of charge but also of a height profile calculated by means of a navigation system.

U.S. Pat. No. 6,381,522 B1 discloses a method for controlling a hybrid vehicle, in which route planning is carried out even without any destination being entered on the basis of a height profile and with a probability distribution for reaching possible route points being calculated, and with traffic information also being taken into account, and the operation of a regenerative braking system and of the internal-combustion engine is controlled as a function of this.

A method for controlling the operating mode in vehicles with hybrid drives is known from DE 100 35 027 A1, in which the driving power demand is estimated with reference to the route profile, which is recorded in a navigation-based manner in the form of resistance-to-travel parameters (such as the gradient, road surface, head wind, etc.), in order to adapt the operating mode more reliably. The route profile is used as a parameter in addition to criteria such as the driving dynamics, the driver behavior and the electrical drive power available. Operation of the internal combustion engine, the electric motor, or a mixture of the two is selected to power the vehicle, depending on the result.

However, in the already known methods, the route profile is in each case taken into account only in a manner which can be used in the specified application or only for the respective application.

SUMMARY OF THE INVENTION

One object of the present invention is to provide a method for identification and prediction of journey situations which allows more flexible use of the information obtained in different applications, and which can be used for controlling the operating mode of different vehicle components.

A method according to the invention for prediction of journey situations has the following steps:

defining a plurality of standard journey situations, with each standard journey situation being characterized by a group of driving state parameters;

defining a plurality of route state parameters in order to describe the state of a journey route;

determining an association rule which associates in each case one group of values of the route state parameters with a standard journey situation;

recording an intended journey route;

determining values of the route state parameters for the intended journey route; and associating the intended journey route with one of the standard journey situations on the basis of the association rule.

Since, according to the invention, the respective intended journey route is associated with one of the previously defined standard journey situations, the intended journey route is evaluated using clearly defined categories, thus ensuring the capability to flexibly assess this evaluation for different applications. Thus, in particular, the idea of the invention is distinguished in that not only is a defined check of an intended route profile carried out by a specific application but, in fact, a standardized analysis, classified using predetermined categories, of the intended journey route is carried out, so that this results in considerably more flexibility with respect to the control (which is subsequently carried out on the basis of this classified analysis) of the operating mode of any desired vehicle component (battery, particle filter, etc.) In this case, the steps of defining a plurality of standard journey situations, defining a plurality of route state parameters and of determining an association rule are preferably carried out only once during the programming of the vehicle (or at least comparatively rarely), while in contrast the further steps of determining an intended journey route, determining values of the route state parameters for the intended journey route, and associating the intended journey route with one of the standard journey situations are carried out on the basis of the association rule from new for each current journey.

A method according to the invention for identification of journey situations has the following steps:

defining a plurality of standard journey situations, with each standard journey situation being characterized by a group of driving state parameters;

determining values of at least one of the driving state parameters for a journey route which has been travelled immediately before a current journey situation;

comparing the values determined for the journey route which has been travelled with the values of the driving state parameters for the standard journey situations; and associating the current journey situation with one of the standard journey situations on the basis of this comparison.

Thus, according to the invention, in this case as well, the current journey situation is associated with one of the previously defined standard journey situations, thus once again resulting in the current journey situation being evaluated using clearly defined categories, and ensuring the capability to assess this evaluation flexibly for different applications. In this case, the first step of defining a plurality of standard journey situations is preferably carried out only once during the programming of the vehicle (or at least comparatively rarely), while in contrast the further steps of determining the values of at least some of the driving state parameters for a journey route which has been travelled before a current journey situation, comparing the values determined for the journey route which has been travelled with the values of the driving state parameters for the standard journey situations, and associating the current journey situation with one of the standard journey situations are carried out from new on the basis of the comparison for each current journey.

In one preferred embodiment, the operating mode of at least one vehicle component is in each case controlled on the basis of the associated (with the intended journey route or the journey route that has been travelled) standard journey situation. In particular, this vehicle component may be the vehicle battery (that is to say control of the battery charging cycle), a particle filter or diesel soot filter (control of the filter regeneration) or else any other desired vehicle component whose operating state is intended to be controlled as a function of the respective journey situation.

The invention also relates to an apparatus which is designed to carry out the abovementioned methods.

Further refinements of the invention can be found in the description and in the dependent claims.

BRIEF DESCRIPTION OF THE DRAWINGS

The invention will be explained in the following text using preferred embodiments and with reference to the attached figures, in which.

DETAILED DESCRIPTION OF A PREFERRED EMBODIMENT

Figure 1:
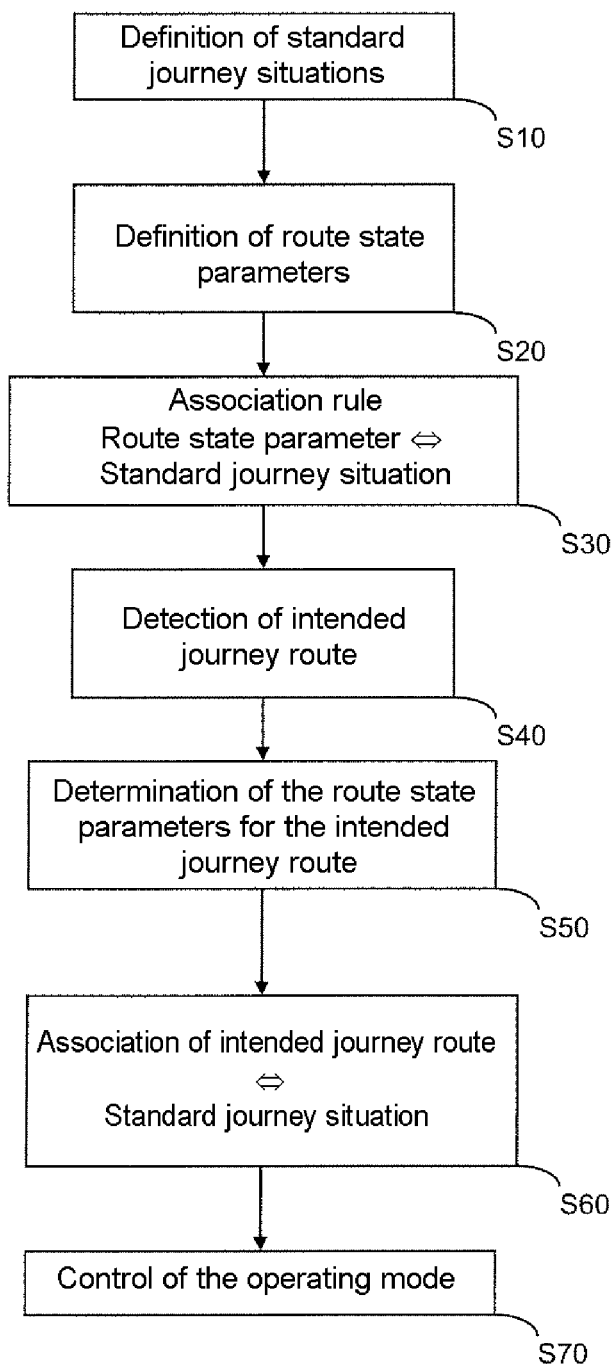
FIG. 1 is a flowchart showing a method according to the invention for prediction of journey situations.

In a method according to the invention for prediction of journey situations, a statistical evaluation of a large number of journeys on different journey routes is carried out in a first step S10 as shown in FIG. 1. Standard journey situations are determined with regard to many factors including the respectively achieved values of the mean overall speed, of the mean cruise speed, of the maximum speed, of the stop frequency, of the amount of idling operation, of the relative amount of deceleration operation, of the relative amount of travel operation, of the relative amount of acceleration operation and of the mean positive acceleration, with these variables being referred to in the following text as driving state parameters.

The values of the driving state parameters obtained are combined to form individual clusters by means of a grouping procedure ("cluster procedure"), in such a way that the number of the respective cluster arises with the general increase in route length and with the mean overall speed. Table 1 shows one typical result, in which the respectively obtained mean values of the abovementioned driving state parameters and the respective mean values of the time duration and of the route length are indicated for each cluster in the ten vertical columns annotated with Roman numerals "I" through "X". The ten individual clusters are referred to in the following text as "standard journey situations", with the first standard journey situation, column "I", corresponding to the situation with inner-city heavy traffic, or heavy traffic within a closed locality. The standard journey situations annotated "II"-"IV" in each case correspond to town traffic situations (with increasingly more smoothly running traffic flow), the standard journey situations annotated "V"-"VII" corresponding to rural traffic situations (in each case running increasingly more smoothly), for example on ordinary roads. The standard journey situations annotated "VIII"-"X" correspond to freeway journeys (with increasingly smoother traffic flow).

TABLE 1

|  | I | II | III | IV | V | VI | VII | VIII | IX | X |
|---|---|---|---|---|---|---|---|---|---|---|
| Journey duration (min) | 7.48 | 5.74 | 5.30 | 7.77 | 10.52 | 13.57 | 18.27 | 29.07 | 46.15 | 112.62 |
| Route length (km) | 2.86 | 2.75 | 3.03 | 4.95 | 7.72 | 11.19 | 16.91 | 32.12 | 60.47 | 186.95 |
| Mean overall speed (km/h) | 21.96 | 27.64 | 33.30 | 36.97 | 43.06 | 49.04 | 55.47 | 66.60 | 79.51 | 100.19 |
| Mean cruise speed (km/h) | 30.28 | 31.33 | 36.23 | 40.93 | 46.90 | 52.89 | 71.30 | 84.21 | 102.95 |  |
| Maximum speed (km/h) | 57.41 | 55.02 | 61.81 | 72.69 | 84.69 | 96.65 | 112.89 | 130.05 | 145.26 | 147.49 |
| Stop frequency (1/km) | 3.23 | 2.05 | 1.36 | 1.19 | 0.82 | 0.61 | 0.47 | 0.31 | 0.21 | 0.08 |
| Idling operation (%) | 27.82 | 11.94 | 8.27 | 9.97 | 8.48 | 7.56 | 7.19 | 6.78 | 5.85 | 2.81 |
| Deceleration operation (%) | 27.16 | 32.92 | 36.12 | 34.23 | 34.72 | 34.65 | 34.05 | 32.87 | 32.92 | 30.42 |
| Travel operation (%) | 16.48 | 21.40 | 18.88 | 20.15 | 20.07 | 20.58 | 21.85 | 24.69 | 25.46 | 34.12 |
| Acceleration operation (%) | 28.54 | 33.73 | 36.72 | 35.66 | 36.73 | 37.22 | 36.90 | 35.66 | 35.77 | 32.63 |
| Mean positive acceleration (m/s$^2$) | 0.84 | 0.79 | 0.82 | 0.80 | 0.76 | 0.72 | 0.70 | 0.64 | 0.59 | 0.49 |

Each of the above standard journey situations "I"-"X" can now be associated with an associated probability distribution of the speed travel values (see Table 2a) and acceleration values (see table 2b) of the motor vehicle, and the probability distribution of the rotation-speed values (see Table 3a) and torque values (table 3b) of the internal combustion engine in the motor vehicle, preferably using those journeys with the values of the driving state parameters which are most typical for each of the respective standard journey situations "I" to "X". The probability distribution obtained in this way for the cruise speed and acceleration values is illustrated in Table 2a for the cluster "I" and in Table 2b for the cluster "X".

TABLE 2a

| Cluster I | Acceleration (m/s$^2$) | | | | | | | | |
|---|---|---|---|---|---|---|---|---|---|
| Speed (km/h) | a ≤ −2 | −2 < a ≤ −1.4 | −1.4 < a ≤ −0.6 | −0.6 < a ≤ −0.2 | −0.2 < a ≤ 0.2 | 0.2 < a ≤ 0.6 | 0.6 < a ≤ 1.4 | 1.4 < a ≤ 2 | a > 2 |
| 0 | 0.2% | 0.3% | 1.1% | 0.3% | 27.8% | 0.0% | 0.0% | 0.0% | 0.0% | 29.7% |
| 1–10 | 0.4% | 0.4% | 1.5% | 2.1% | 1.7% | 1.3% | 1.4% | 0.4% | 0.3% | 9.5% |
| 11–20 | 0.4% | 0.5% | 1.7% | 2.6% | 1.7% | 2.2% | 1.6% | 0.5% | 0.5% | 11.8% |
| 21–30 | 0.3% | 0.4% | 1.7% | 3.3% | 2.5% | 3.4% | 2.3% | 0.5% | 0.2% | 14.6% |
| 31–40 | 0.1% | 0.3% | 1.4% | 3.7% | 2.8% | 3.8% | 1.8% | 0.4% | 0.1% | 14.4% |
| 41–60 | 0.0% | 0.1% | 1.0% | 5.3% | 5.6% | 6.0% | 1.6% | 0.2% | 0.1% | 19.9% |
| 61–80 | 0.0% | 0.0% | 0.0% | 0.0% | 0.1% | 0.1% | 0.0% | 0.0% | 0.0% | 0.2% |
| 81–100 | 0.0% | 0.0% | 0.0% | 0.0% | 0.0% | 0.0% | 0.0% | 0.0% | 0.0% | 0.0% |
| 101–120 | 0.0% | 0.0% | 0.0% | 0.0% | 0.0% | 0.0% | 0.0% | 0.0% | 0.0% | 0.0% |
| 121–140 | 0.0% | 0.0% | 0.0% | 0.0% | 0.0% | 0.0% | 0.0% | 0.0% | 0.0% | 0.0% |
| >140 | 0.0% | 0.0% | 0.0% | 0.0% | 0.0% | 0.0% | 0.0% | 0.0% | 0.0% | 0.0% |
| | 1.3% | 2.1% | 8.3% | 17.4% | 42.2% | 16.7% | 8.7% | 2.0% | 1.2% | 100.0% |

TABLE 2b

| Cluster X | Acceleration (m/s$^2$) | | | | | | | | |
|---|---|---|---|---|---|---|---|---|---|
| Speed (km/h) | a ≤ −2 | −2 < a ≤ −1.4 | −1.4 < a ≤ −0.6 | −0.6 < a ≤ −0.2 | −0.2 < a ≤ 0.2 | 0.2 < a ≤ 0.6 | 0.6 < a ≤ 1.4 | 1.4 < a ≤ 2 | a > 2 |
| 0 | 0.0% | 0.0% | 0.1% | 0.0% | 2.5% | 0.0% | 0.0% | 0.0% | 0.0% | 2.7% |
| 1–10 | 0.0% | 0.0% | 0.1% | 0.3% | 0.2% | 0.1% | 0.1% | 0.0% | 0.0% | 1.0% |
| 11–20 | 0.0% | 0.1% | 0.2% | 0.3% | 0.2% | 0.2% | 0.2% | 0.1% | 0.1% | 1.3% |
| 21–30 | 0.0% | 0.1% | 0.2% | 0.3% | 0.2% | 0.3% | 0.2% | 0.1% | 0.0% | 1.4% |
| 31–40 | 0.0% | 0.1% | 0.2% | 0.4% | 0.3% | 0.4% | 0.3% | 0.1% | 0.0% | 1.7% |
| 41–60 | 0.1% | 0.1% | 0.5% | 1.1% | 0.8% | 1.2% | 0.6% | 0.1% | 0.0% | 4.5% |
| 61–80 | 0.1% | 0.1% | 0.5% | 1.6% | 1.5% | 1.7% | 0.6% | 0.1% | 0.0% | 6.2% |
| 81–100 | 0.0% | 0.1% | 0.8% | 3.5% | 3.8% | 3.9% | 0.8% | 0.0% | 0.0% | 12.9% |
| 101–120 | 0.0% | 0.0% | 0.8% | 9.8% | 15.2% | 10.6% | 0.6% | 0.0% | 0.0% | 37.1% |
| 121–140 | 0.0% | 0.0% | 0.7% | 7.8% | 9.2% | 8.5% | 0.7% | 0.0% | 0.0% | 27.0% |
| >140 | 0.0% | 0.0% | 0.1% | 1.2% | 1.3% | 1.5% | 0.2% | 0.0% | 0.0% | 4.3% |
| | 0.4% | 0.6% | 4.2% | 26.2% | 35.3% | 28.4% | 4.3% | 0.4% | 0.2% | 100.0% |

As can be seen by way of example from Table 2b, 15.2% of the time during which the vehicle is in the journey situation X can be expected to represent a combination of a speed between 101 and 120 km/h in conjunction with an acceleration between −0.2 m/s$^2$ and +0.2 m/s$^2$.

The probability distribution obtained for the rotation-speed values and torque values of the internal combustion engine is illustrated in Table 3$a$ for the cluster "I" and in Table 3$b$ for the cluster "X".

TABLE 3a

| Cluster I | Rotation speed (revolutions per minute) | | | | | | | |
|---|---|---|---|---|---|---|---|---|
| Torque (Nm) | N ≤ 1000 | 1000 < s ≤ 2000 | 2000 < n ≤ 3000 | 3000 < n ≤ 4000 | 4000 < n ≤ 5000 | 5000 < n ≤ 6000 | 6000 < n ≤ 7000 | |
| T > 130 | 0.0% | 0.2% | 0.2% | 0.1% | 0.0% | 0.0% | 0.0% | 0.4% |
| 105 < T ≤ 130 | 0.1% | 1.5% | 0.7% | 0.1% | 0.0% | 0.0% | 0.0% | 2.3% |
| 90 < T ≤ 105 | 0.1% | 1.4% | 0.7% | 0.0% | 0.0% | 0.0% | 0.0% | 2.2% |
| 75 < T ≤ 90 | 0.1% | 1.9% | 0.9% | 0.1% | 0.0% | 0.0% | 0.0% | 2.9% |

TABLE 3a-continued

| Cluster I | Rotation speed (revolutions per minute) | | | | | | | |
|---|---|---|---|---|---|---|---|---|
| Torque (Nm) | N ≤ 1000 | 1000 <≤ 2000 | 2000 < n ≤ 3000 | 3000 < n ≤ 4000 | 4000 < n ≤ 5000 | 5000 < n ≤ 6000 | 6000 < n ≤ 7000 | |
| 60 < T ≤ 75 | 0.1% | 2.7% | 1.3% | 0.1% | 0.0% | 0.0% | 0.0% | 4.3% |
| 45 < T ≤ 60 | 0.2% | 4.7% | 1.6% | 0.1% | 0.0% | 0.0% | 0.05 | 6.6% |
| 30 < T ≤ 45 | 2.0% | 6.7% | 2.7% | 0.2% | 0.0% | 0.0% | 0.0% | 11.7% |
| 15 < T ≤ 30 | 5.3% | 11.0% | 3.6% | 0.1% | 0.0% | 0.0% | 0.0% | 20.1% |
| 0 < T ≤ 15 | 21.7% | 13.2% | 4.3% | 0.1% | 0.0% | 0.0% | 0.0% | 39.3% |
| T ≤ 0 | 0.0% | 7.0% | 3.2% | 0.1% | 0.0% | 0.0% | 0.0% | 10.3% |
| | 29.5% | 50.4% | 19.2% | 1.0% | 0.0% | 0.0% | 0.0% | 100% |

TABLE 3b

| Cluster X | Rotation speed (revolutions per minute) | | | | | | | |
|---|---|---|---|---|---|---|---|---|
| Torque (Nm) | N ≤ 1000 | 1000 <≤ 2000 | 2000 < n ≤ 3000 | 3000 < n ≤ 4000 | 4000 < n ≤ 5000 | 5000 < n ≤ 6000 | 6000 < n ≤ 7000 | N ≤ 1000 |
| T > 130 | 0.0% | 0.1% | 0.8% | 0.9% | 0.1% | 0.0% | 0.0% | 1.9% |
| 105 < T ≤ 130 | 0.0% | 0.2% | 2.7% | 4.3% | 0.1% | 0.0% | 0.0% | 7.4% |
| 90 < T ≤ 105 | 0.0% | 0.2% | 4.0% | 5.3% | 0.1% | 0.0% | 0.0% | 9.7% |
| 75 < T ≤ 90 | 0.0% | 0.4% | 6.2% | 6.4% | 0.1% | 0.0% | 0.0% | 13.1% |
| 60 < T ≤ 75 | 0.0% | 0.4% | 8.7% | 7.8% | 0.1% | 0.0% | 0.0% | 17.0% |
| 45 < T ≤ 60 | 0.0% | 0.5% | 7.5% | 6.1% | 0.1% | 0.0% | 0.0% | 14.3% |
| 30 < T ≤ 45 | 0.1% | 0.8% | 5.7% | 4.3% | 0.1% | 0.0% | 0.0% | 10.9% |
| 15 < T ≤ 30 | 0.7% | 1.6% | 4.1% | 2.8% | 0.0% | 0.0% | 0.0% | 9.2% |
| 0 < T ≤ 15 | 2.6% | 2.4% | 3.4% | 1.6% | 0.0% | 0.0% | 0.0% | 10.0% |
| T ≤ 0 | 0.0% | 1.5% | 4.0% | 1.1% | 0.0% | 0.0% | 0.0% | 6.7% |
| | 3.4% | 8.2% | 47.1% | 40.7% | 0.7% | 0.0% | 0.0% | 100.0% |

The data summarized in Tables 2 and 3 is preferably taken into account only in the development of the corresponding application without needing to be stored in the implementation. This considerably reduces the communication since only the cluster numbers need be communicated. If required, however the data can also be stored by the respective application, and can be updated dynamically before use.

In a next step S20, suitable route state parameters are now determined in order to describe the state of any given route section. The route state parameters may, for example, be the route length, a speed restriction, the number of lanes, the number of traffic lights or a symbol for the presence of a traffic light at the end of the route section.

An association rule is now determined in the next step S30, wherein one group of values of the route state parameters is in each case associated with one standard journey situation. This is preferably done in such a way that the probability distribution for specific combinations of values of the route state parameters is determined on the basis of the statistically evaluated journeys on different individual journey routes, and each combination of values of the route state parameters is associated with the most probable standard journey situation. Table 4 shows one example of an association rule:

TABLE 4

| Rule | Speed restriction (km/h) | Road function class | Number of lanes | Traffic light at the end of section? | Standard journey situation |
|---|---|---|---|---|---|
| 1 | 30 | 0 | 1 | Yes | 1 |
| 2 | 30 | 1 | 1 | No | 3 |
| 3 | 50 | 0 | 1 | Yes | 1 |
| 4 | 50 | 1 | 1 | No | 3 |
| 5 | 50 | 2 | 1 | No | 1 |
| 6 | 50 | 3 | 1 | Yes | 1 |
| 7 | 50 | 3 | 2 | Yes | 3 |
| 8 | 70 | 3 | 2 | Yes | 6 |
| 9 | 100 | 3 | 2 | No | 7 |
| 10 | — | 3 | 1 | No | 6 |
| 11 | — | 4 | 2 | No | 10 |

The definition of these rules must either cover all possible attribution combinations, or a suitable prioritization must be defined.

Figure 2:
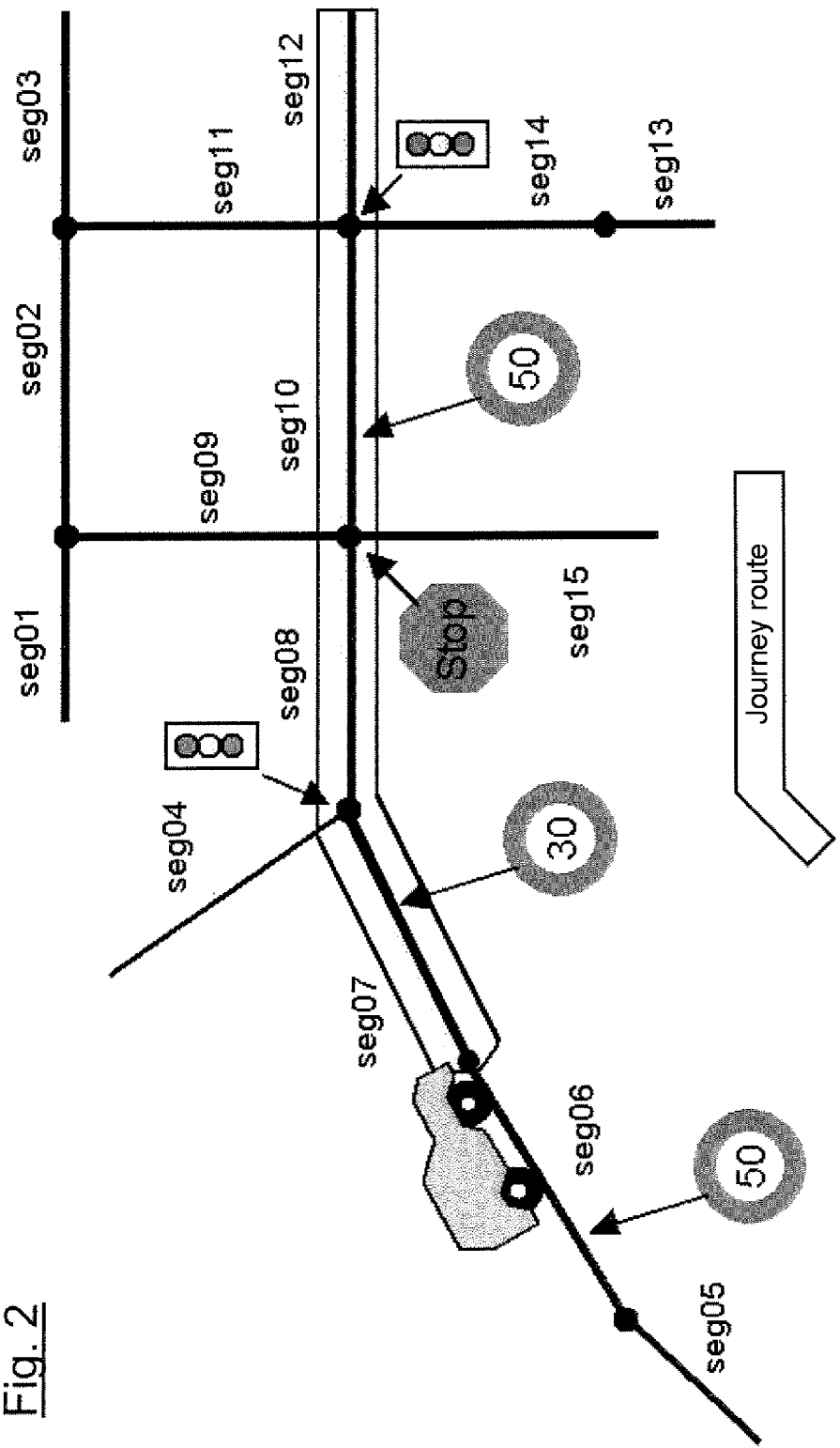
FIG. 2 is a diagram illustrating the subdivision of an area of a road map which is stored in a navigation system into individual segments with different combinations of values of route state parameters.

An intended journey route is now determined in the next step S40, preferably by means of a navigation system. The determined intended journey route is preferably subdivided first of all into suitable route sections before further evaluation, with each route section being characterized by a group of values of the route state parameters. In order to illustrate a subdivision such as this, FIG. 2 uses a diagram to illustrate, only schematically, how a road map which is stored in digital form in the navigation system can be broken down into individual segments, which are inscribed "seg01" to "seg15", with these segments seg01-seg15 being separated from one another by nodes that are shown in each case, and with there being different combinations of values of the route state parameters (for example speed restriction, number of lanes, etc.) in the individual segments seg01-seg15. By way of example, the segments "seg06" is associated with the following route state parameters "speed restriction=50, number of lanes=1, traffic light at the end of the route section=No", while in contrast the segment seg07 is associated with the following route state parameters "speed restriction=30, number of lanes=1, traffic light at the end of the route section=Yes", etc.

According to one preferred embodiment, not only is a single intended journey route determined in step S40 but one or more alternative routes are also taken into account (for example those routes which are virtually equivalent on the basis of the selection criteria of the navigation system, or potential diversion routes in the event of traffic jams). In particular, it is then possible to use a probability value for the possibility that the driver will choose the alternative route; one such probability value may be calculated by the navigation system for example from the relationship between the "route assessments", while, if required, routes which have been preferred by the driver from previous journeys can also be used and taken into account.

In a further step S50, the values of the respective route state parameters are associated with the individual route sections for the intended journey route or routes determined in step S40, as is shown by way of example in Table 5:

TABLE 5

| Route section | Length (m) | Road function class (0...4) | Speed restriction (km/h) | Number of lanes | Traffic light at the end of the route section? |
|---|---|---|---|---|---|
| 1 | 500 | 1 | 50 | 1 | Yes |
| 2 | 410 | 1 | 70 | 2 | No |
| 3 | 30 | 3 | 90 | 2 | No |
| ... | | | | | |

The individual route sections of the intended journey route are now each associated in the next step S60 with one of the standard journey situations (corresponding to Table 1) on the basis of the association rule (corresponding to Table 4) and in accordance with the values of the route state parameters that have been obtained (corresponding to Table 5), so that the analysis results give a sequence of standard journey situations, without any gaps, for the entire intended journey route.

Since, as has been stated in conjunction with step S40, the determination of the intended journey route also takes account of one or more alternative routes, and also since a probability value for the selection of this alternative route by the driver has been produced for each of these alternative routes, therefore the classification of the secondary route(s) and that of the optimum route can be weighted with the respective probability in the association process carried out in step S60, so that intermediate values can also be created between individual classifications and standard journey situations.

On the basis of the association as carried out in step S60 between the intended journey route and one of the standard classifications or standard journey situations, or any intermediate values between such classifications, the operating mode of any desired vehicle component can then be controlled in step S70.

Furthermore, successive route sections with the same standard journey situation are preferably combined to form a common section, thus making it possible to reduce the amount of data that needs to be provided for the respective application. The information that is generated can be further compressed as required by the formation of weighted means, for example in order to determine the expected average speed or idling rate for the entire route.

Figure 3:
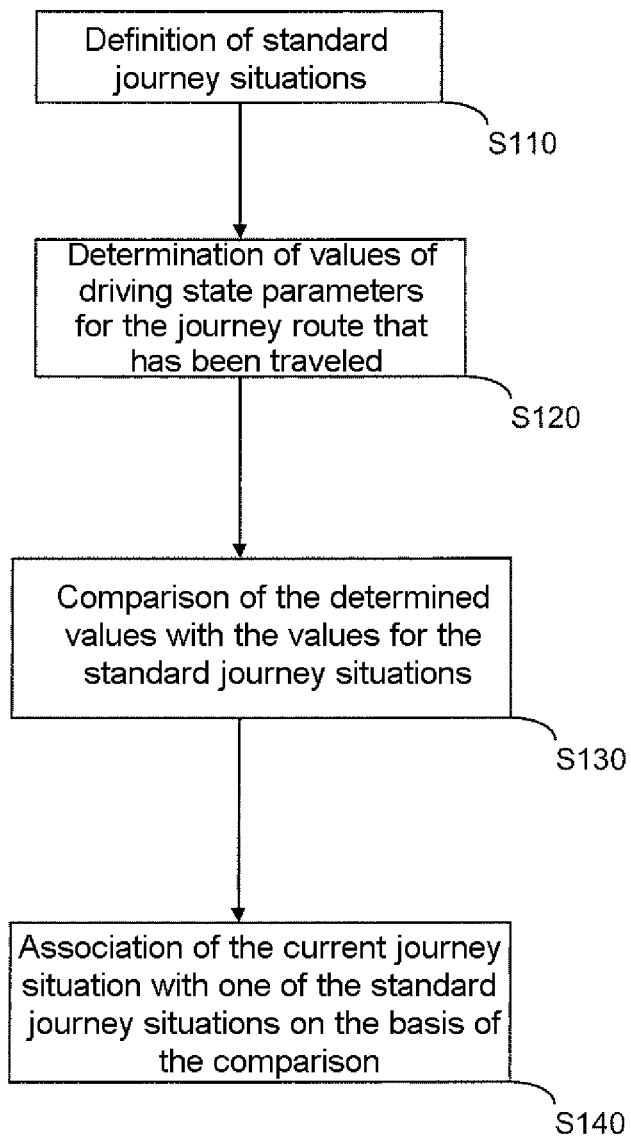
FIG. 3 is a flowchart showing a procedure according to the invention for identification of journey situations.

In the case of a method according to the invention for identification of journey situations, a statistical evaluation of a large number of individual journeys on different journey routes is carried out in a first step S110, as shown in FIG. 3, in order to define standard journey situations. This step corresponds to the first step in the method as described above and illustrated in FIG. 1, so that there is no need to explain this in detail.

In a next step S120, the values of at least some of the driving state parameters, whose values also characterize the standard journey situations (see Table 1), are determined for a journey route which has been travelled immediately before a current journey situation. According to one exemplary embodiment, by way of example, the respective values of 1) the mean overall speed, 2) the mean cruise speed, 3) the maximum speed, 4) the stop frequency, 5) the amount of idling operation, 6) the relative amount of deceleration operation, 7) the relative amount of cruise operation, 8) the relative amount of acceleration operation and 9) the mean positive acceleration can be determined for the last 500 m travelled by the vehicle.

In the next step S130, the determined values of the driving state parameters (that is to say the 9-dimensional vector from the driving state parameters in the above example) for the journey route that has been travelled are compared with the respective values (or the corresponding 9-dimensional vector) for the standard journey situations (see Table 1).

On the basis of this comparison, that standard driving situation which provides the best match with a suitable standard for the above vector comparison is then associated with the current journey situation in step S140. In this way, the invention thus creates a "real-time" method for identification of journey situations, in which the journey situation is once again evaluated using different categories or standard journey situations such that the information obtained can be used for different applications, for example for control of a battery charging cycle, or else a particle filter regeneration cycle.

Furthermore, the identification of journey situations during the journey can be used in order to correct incorrect predictions, for example in the case of a jam on the freeway, where the information from the map does not match the current traffic situation. Adaptive matching of the association rules determined in step S30 to the specific situation of a vehicle is thus possible.

The invention claimed is:

1. A method for prediction of journey situations, comprising the following steps:
defining a plurality of standard journey situations, each standard journey situation based on a plurality of driving state parameters, wherein the plurality of driving state parameters are chosen from a group of variables comprising a mean overall speed, a mean cruise speed, a maximum speed, a stop frequency, an amount of idling operation, an amount of relative deceleration operation, an amount of relative travel operation, an amount of relative acceleration operation, and a mean positive acceleration, said step of defining the plurality of standard journey situations includes obtaining values of the driving state parameters and combining the values to form individual clusters by means of a grouping procedure whereby each cluster identifies a standard journey situation, with each standard journey situation having a unique identifier assigned thereto, the standard journey situations constituting a discrete number of categories;

defining a plurality of route state parameters describing the state of a journey route;

determining at least one association rule which associates a set of route state parameter values with one of the standard journey situations;

recording an intended journey route;

determining values of the route state parameters for the intended journey route; and associating the intended journey route with one of the standard journey situations on the basis of the association rule, such that the unique identifier of the standard journey situation is associated with the intended journey route whereby monitoring the unique identifier provides information regarding the driving state parameters along the intended journey route.

2. The method as claimed in claim 1, further comprising the following step:

monitoring the unique identifier associated with the intended journey route and controlling the operating mode of at least one vehicle component on the basis of the unique identifier.

3. The method as claimed in claim 1, wherein the recording of the intended journey route is navigation-based.

4. The method as claimed in claim 1, wherein each standard journey situation has an associated probability distribution of the cruise speed values and of the associated acceleration values and/or of the rotation-speed values and the associated torque values of the motor vehicle.

5. The method as claimed in claim 1, wherein at least one of the plurality of standard journey situations is defined by statistical evaluation of a large number of individual journeys which have previously been carried out on different journey routes.

6. The method as claimed in claim 2, wherein the plurality of route state parameters includes at least some of the following variables, route length, speed restriction, number of lanes and number of traffic lights.

7. The method as claimed in claim 6 wherein the at least one vehicle component, one or more of the vehicle component is selected from a group including a vehicle battery, a particle filter and a diesel soot filter.

* * * * *